(12) United States Patent
Hundscheidt et al.

(10) Patent No.: US 8,571,013 B2
(45) Date of Patent: Oct. 29, 2013

(54) TECHNIQUE FOR INTERCONNECTING CIRCUIT-SWITCHED AND PACKET-SWITCHED DOMAINS

(75) Inventors: Frank Hundscheidt, Kerkrade (NL); Christer Johansson, Segeltorp (SE); Lennart Norell, Alvsjo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 957 days.

(21) Appl. No.: 12/088,376

(22) PCT Filed: Oct. 4, 2005

(86) PCT No.: PCT/EP2005/010687
§ 371 (c)(1),
(2), (4) Date: Aug. 20, 2008

(87) PCT Pub. No.: WO2007/038961
PCT Pub. Date: Apr. 12, 2007

(65) Prior Publication Data
US 2009/0034511 A1    Feb. 5, 2009

(51) Int. Cl.
*H04L 12/66* (2006.01)
(52) U.S. Cl.
USPC ............................................. 370/352
(58) Field of Classification Search
None
See application file for complete search history.

(56) References Cited

U.S. PATENT DOCUMENTS

| 6,721,565 | B1 | 4/2004 | Ejzak et al. |
| 7,203,163 | B1 | 4/2007 | Hundscheidt et al. |
| 2001/0036173 | A1* | 11/2001 | Shmulevich et al. ......... 370/352 |
| 2002/0097708 | A1* | 7/2002 | Deng ............................ 370/352 |
| 2002/0131575 | A1 | 9/2002 | Gallant |
| 2003/0027595 | A1 | 2/2003 | Ejzak |
| 2003/0131132 | A1* | 7/2003 | Cheng et al. .................. 709/239 |
| 2004/0184439 | A1 | 9/2004 | Blanc et al. |
| 2005/0083909 | A1* | 4/2005 | Kuusinen et al. ............. 370/352 |
| 2005/0203994 | A1 | 9/2005 | Palmer et al. |
| 2007/0121673 | A1* | 5/2007 | Hammer ....................... 370/468 |

FOREIGN PATENT DOCUMENTS

WO    WO 2005/025196 A1    3/2005

OTHER PUBLICATIONS

Waki, H et al. Signalling Protocols for Next Generation Networks. IEICE Technical Report, Oct. 20, 200, vol. 100; No. 394; p. 31-36.
Don Sun et al: "A SIP-Enabled All-IP Architecture for Converged Next-Generation Networks" Bell Labs Technical Journal, [Online] vol. 9, No. 3, Nov. 8, 2004, pp. 15-37, XP007900578 Retrieved from the Interenet: URL:http://www3.interscience.wiley.com/cgi-bin/abstract/109751032/ABSTRACT?CRETRY=1&SRETRY=0> [retrieved on May 3, 2006] the whole document.
Wireless Priority Service (WPS) industry Requirements for UMTS—Phase 1—Redirection to GSM Issue 1.0, Jun. 10, 2005 Draft.
Wireless Priority Service (WPS) Industry Requirements for the Full Operating Capability (FOC) for GSM-Based Systems Industry Requirement (IR) Document Issue 2.0, Jan. 2004.
Cookson, et al. 3G Service Control. BR Technology Journal. vol. 19 No. 1. Jan. 1, 2001.

* cited by examiner

*Primary Examiner* — Minh-Trang Nguyen

(57) ABSTRACT

A technique for interconnecting circuit-switched (CS) and packet-switched (PS) domains enables network components (302) having a PS network access to make use of CS telephony services. A method embodiment of this technique comprises the steps of receiving PS control information according to a PS control protocol such as SIP, determining, in response to receipt of the PS control information, CS control information according to a CS control protocol such as DTAP, and sending the determined CS control information to a second network component (324) that is located on an application (or service) layer for provision of CS services, based on the determined CS control information, to the first network component (302).

26 Claims, 5 Drawing Sheets

TECHNIQUE FOR INTERCONNECTING CIRCUIT-SWITCHED AND PACKET-SWITCHED DOMAINS

FIELD OF THE INVENTION

The present invention generally relates to a technique for interconnecting circuit-switched (CS) and packet-switched (PS) domains. In particular, the invention relates to the provision of CS services to a network component having a PS network access.

BACKGROUND OF THE INVENTION

The Internet protocol (IP) multimedia subsystem (IMS) defined by the 3$^{rd}$ generation partnership project (3GPP) represents a PS service delivery platform architecture for the provision of IP multimedia services within emerging all-IP network environments. The IMS comprises three main components: the serving call session control function (S-CSCF) on a control layer, and the home subscriber server (HSS) as well as the session initiation protocol (SIP) application server (SIP-AS) on an application layer.

During operation, the S-CSCF forwards SIP messages received from user terminals or other network components to the SIP-AS. Based on the received SIP messages, the SIP-AS determines the services that are to be provided to a particular user. During the execution of a particular service, the SIP-AS may require additional information about a user and may to this end communicate with the HSS. The HSS stores a service profile for each user and can thus be regarded as the equivalent to the home location register (HLR) in conventional second (and third) generation networks such as GSM (global system for mobile communication) networks.

IMS has been preceded by a change in network topology—that is, the migration towards layered network architectures. Whereas in conventional second generation networks a single component, the mobile switching center (MSC), handles both call control and connectivity, in layered networks these functionalities have been split. More specifically, call control is handled by MSC servers (MSC-S) in the control layer, whereas connectivity is handled by media gateways (MGW) in the connectivity layer. This separation of call control and connectivity is also referred to as mobile softswitching (MSS).

The MSC-S handles the network signalling and intelligence for setting up, releasing and monitoring CS connections. The MGW, on the other hand, processes and manages the transport of CS payload traffic (such as voice or data traffic). The MGW additionally provides interconnections to external networks including public switched telephone networks (PSTNs) and public land mobile networks (PLMNs).

Network operators with an installed MSS environment or with the intention to deploy MSS will want to ensure a smooth transition from MSS and the CS domain to an all-IP solution. From a migration perspective, and also with regard to a reuse of installed equipment, operators will preferably use CS services (such as CS telephony services) during a co-existence period also for IMS subscribers having PS network access.

The object underlying the invention is to propose a technique for interconnecting CS and PS domains. In particular, a technique for providing CS services to a network component having a PS network access is required.

SUMMARY OF THE INVENTION

According to a first aspect of the invention, a method of controlling the provision of CS services to a first network component having a PS network access is provided, wherein the method comprises receiving PS control information according to a PS control protocol, determining, in response to receipt of the PS control information, CS control information according to a CS control protocol, and sending the determined CS control information to a second network component that is located on an application (or service) layer for controlling, based on the determined CS control information, provision of CS services to the first network component.

The PS control information may include at least one of one or more PS control messages and one or more PS control parameters. In one variation, the PS control messages are SIP messages and the PS control parameters are SIP parameters. The CS control information may include at least one of one or more CS control messages and one or more CS control parameters. In one variation, the CS control messages are base station system management application part (BSSMAP) messages or direct transfer application part (DTAP) messages, and the CS control parameters are DTAP parameters or BSSMAP parameters. The CS control information may comprise one or more of information pertaining to a requested service type (such as voice, video, multimedia, etc.), information required to establish CS services, information about how to execute CS services, and information about the status or result of CS services (e.g., indicating a successful service establishment or a service establishment failure).

The determination of the CS control information may be performed in various ways. In a first example, the CS control information is encapsulated in the PS control information (e.g. in a PS control message), and the step of determining the CS control information includes de-encapsulating the encapsulated CS control information (such as one or more CS control parameters) from the PS control information. In a second example, that can be combined with the first example, the step of determining the CS control information includes mapping the PS control information to the CS control information.

The step of determining the CS control information can be performed on the control layer, on the application layer or on any intermediate layer. It is also possible that the determination step includes several sub-steps that are performed on different layers. Preferably, the CS control information is determined by services intermediating between a PS control layer and a CS application layer.

Several information handling services may be provided (preferably in the PS domain) for a flexible control of the information flow. The flexible control of the information flow facilitates migration towards an all-IP environment. In one example, first services (such as an SIP-AS) interpreting the PS control information by default and second services (such as a dedicated AS) capable of determining the CS control information are provided. The individual services may be co-located in a single hardware component or may be dispersed among various hardware components.

According to a first scenario, the received PS control information is first routed to the first services, and then re-routed from the first services to the second services. The re-routing may be performed on a selective basis (i.e., the second services may see only a part of the received PS information). To this end, the first services may perform a decision step to determine whether or not to re-route the PS control information. This decision step can be based on a service portfolio of the first services. If, for example, the first services can provide or control the requested services themselves, no re-routing will occur. If, on the other hand, the first services can not provide or control the requested services, the re-routing step towards the second services will be performed. The decision step can additionally, or in the alternative, be based on a request included in the received PS control information. The request may take the form of an indicator sent from the first network component (e.g. from a user terminal) that a specific service is to be executed by the first or second services. The request may be included by the first network component, by a network operator, or by any other network entity. By such a mechanism, the first network component or the network operator may for example control whether a particular service is to be provided in the PS domain (via the first services) or in the CS domain (via the second services).

According to a second scenario, that can be combined with the first scenario, the received PS control information is selectively routed to either the first services or the second services. This selective routing may be performed by a network component on a control layer such as a CSCF. The decision whether to route the PS control information to the first services or to the second services may be dependent upon one or more of the following criteria: the CS services requested, load-balancing considerations, capabilities of the first network component, trigger events defined by a network operator, user requests, and user service profiles.

According to a third scenario, that can be combined with any one or both of the first and second scenario, it is possible that both the first services and second services are invoked. This approach is particularly useful when a part of the requested services are executed in the PS domain (via the first services) and another part in the CS domain (via the second services). Note that it may even happen that the first services (PS) modify PS information upon which the second services (CS) are invoked by a controlling network component when the first services return the control to the controlling network component (or vice versa).

The network component on the application layer which provides the requested CS services can by arranged in a conventional CS network. In one variation, the CS services are provided by component of a layered MSS network. In such a case, the CS services can be provided by a MSC server (MSC-S). The MSC-S can be transferred from the control layer (where it will conventionally be located) to the application layer and may additionally be relieved of its control tasks.

Until now, the information flow from the PS domain to the CS domain has been described. Of course, the information could also flow in the other direction from the CS domain to the PS domain. In such a case, the method could further comprise the steps of receiving CS control information and determining corresponding PS control information as a response to receipt of the CS control information. The PS control information thus determined could then be sent to the first network component having PS network access (e.g. a user terminal) or any other network component in the PS domain.

Upon initiation of the information flow, the first network component can get registered in the PS domain. Additionally, the first network component can get registered in the CS domain (e.g., using the protocol conversion steps discussed above or any other approach).

The invention can be implemented as software, as hardware or as a software/hardware combination. As regards a software aspect, a computer program product comprising program code portions for performing the steps of the above methods when the computer program product is run on one or more computing devices is provided. The computer program product may be stored on a computer readable recording medium.

According to a hardware aspect of the invention, a device for interconnecting PS and CS domains is provided. The device comprises a control component for receiving PS A control information according to a PS control protocol, a protocol converter for determining, in response to receipt of the PS control information, CS control information according to a CS control protocol, and an interface for sending the determined CS control information to a serving network component that is located on an application layer and provides the CS services based on the determined CS control information.

The protocol converter preferably includes program code for at least one of mapping the received PS control information to predefined CS control information and de-encapsulating the CS control information from the PS control information. The protocol converter may be co-located with one of the control component, the serving network component and a service component that handles the PS control information by default.

BRIEF DESCRIPTION OF THE DRAWINGS

In the following, the invention will be described with reference to exemplary embodiments illustrated in the Figs., in which.

DETAILED DESCRIPTION OF PREFERRED EMBODIMENTS

In the following description, for purposes of explanation and not limitation, specific details are set forth, such as particular signal formats, messaging protocols, etc. in order to provide a thorough understanding of the current invention. It will be apparent to one skilled in the art that the current invention may be practised in other embodiments that depart from these specific details. For example, the skilled artisan will appreciate that the current invention may be practised with PS standards different from the SIP standard discussed below to illustrate the present invention. Also, the invention may be practised with CS standards different from the DTAP and BSSMAP standards discussed below.

Those skilled in the art will further appreciate that functions explained herein below may be implemented using individual hardware circuitry, using software functioning in conjunction with a programmed micro processor or general purpose computer, using an application specific integrated circuit (ASIC), and/or using one or more digital signal processors (DSPs). It will also be appreciated that while the current invention is primarily described as a method, it may also be embodied in a computer processor and a memory coupled to the processor, wherein the memory is encoded with one or more programs that perform the methods disclosed herein.

Figure 1A:
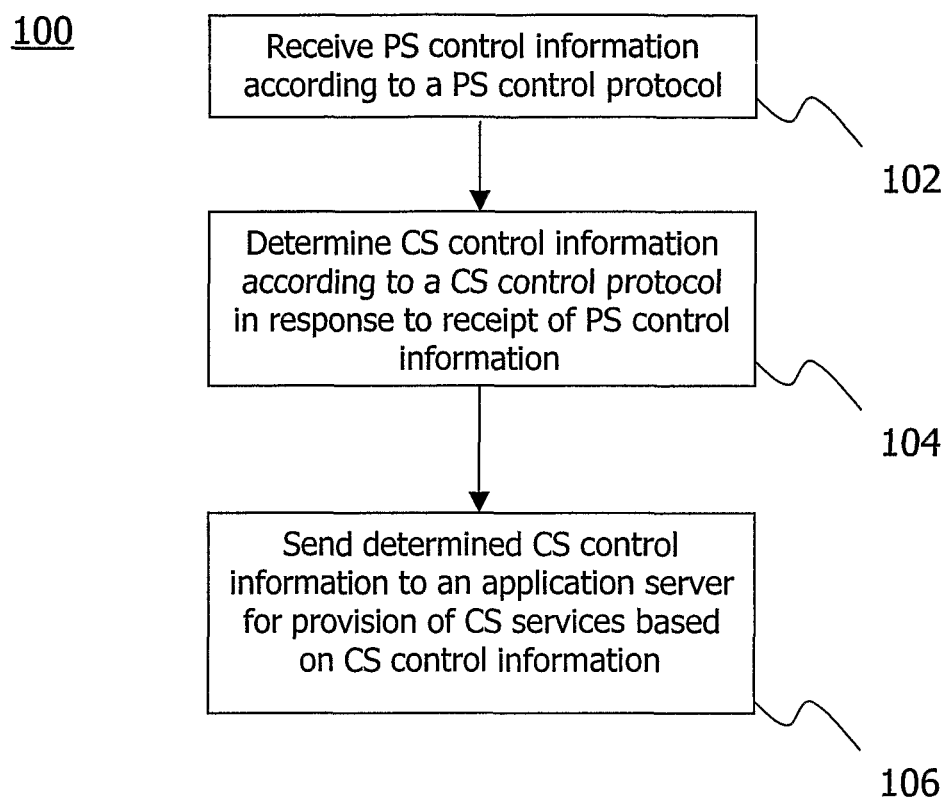
FIG. 1A is a schematic flow chart illustrating a first method embodiment of the present invention.

With reference to FIG. 1A, a flow chart 100 shows the individual steps of a first method embodiment for interconnecting PS and CS domains with the purpose of controlling the provision of CS services to a first network component having a PS network access.

In a first step 102, PS control information according to a PS control protocol is received via a first network. A next step 104 is performed in response to the receipt of PS control information in step 102. In step 104, CS information according to a CS protocol is determined. In a third step 106, the determined CS control information is sent to a second network component located on an application (or service) layer. Under control of the received CS control information, the second network component provides CS services to the first network component.

Figure 1B:
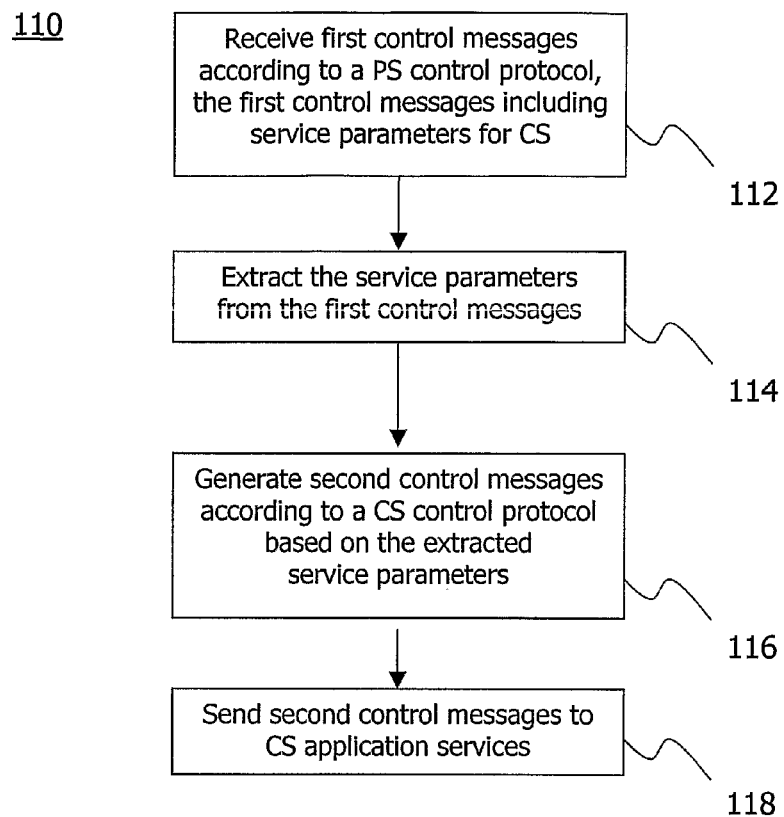
FIG. 1B is a schematic flow chart illustrating a second method embodiment of the present invention.

With reference to FIG. 1B, a flow chart 110 shows the individual steps of a second method embodiment for interconnecting PS and CS domains.

In a first step 112, one or more first control messages according to a PS control protocol are received via a first network. The one or more first control messages include service information that relates to the provision of CS services such as telephony services or multimedia services.

In a next step 114, the service information is extracted or otherwise derived from the one or more first control messages.

In a third step 116, one or more second control messages according to a CS control protocol are generated. The one or more second control messages are generated based on the service information determined in step 114.

In a fourth step 118, the one or more generated second control messages are sent to CS application services that are to be controlled (e.g., initiated, terminated, etc.) by the one or more second control messages.

The steps shown in FIGS. 1A and 1B show an information flow from the PS domain towards the CS domain. It will be appreciated that the steps can be performed in an analogous manner for an information flow from the CS domain towards the PS domain.

Figure 2:
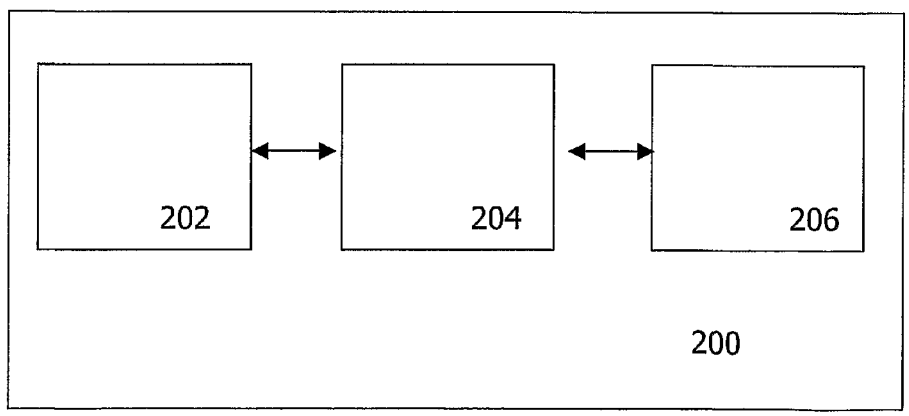
FIG. 2 is a schematic block diagram showing a device embodiment of the present invention.

FIG. 2 shows a protocol conversion device 200 in which the above methods for interconnecting PS and CS domains can be practised. The device 200 comprises an information reception component 202, a protocol converter 204 and an interface 206.

The component 202 is configured to receive PS control information such as one or more first control messages according to a PS control protocol. The component 202 is coupled to the protocol converter 204 and capable of transferring the received PS information to the protocol converter 204. In response to receipt of the PS information, the protocol converter determines CS control information according to a CS control protocol. To this end, the protocol converter 204 maps the received PS information to CS information, extracts CS information from the received PS information, or performs any other steps.

As can be seen in FIG. 2, the protocol converter 204 is coupled to the interface 206. The interface 206 allows the transfer of the CS control information generated by the protocol converter 204 to a network component (not shown in FIG. 2) that is located on an application layer and that provides CS services under control of the transferred CS control information.

The interface 206 may additionally or alternatively be configured to receive CS control information according to a CS control protocol. Moreover, in a similar manner as discussed above, the protocol converter 204 can additionally or alternatively be capable of determining, in response to receipt of the CS control information, PS control information according to the PS control protocol. The PS control information thus determined may be sent via the reception component 202 or any other component towards a PS network.

It should be noted that the protocol converter 204 may include one, two or more individual services for performing the conversion steps. Additionally, the protocol converter 204 may be associated with a configuration component (not shown) specifying for example mapping criteria, default messages, etc.

Figure 3:
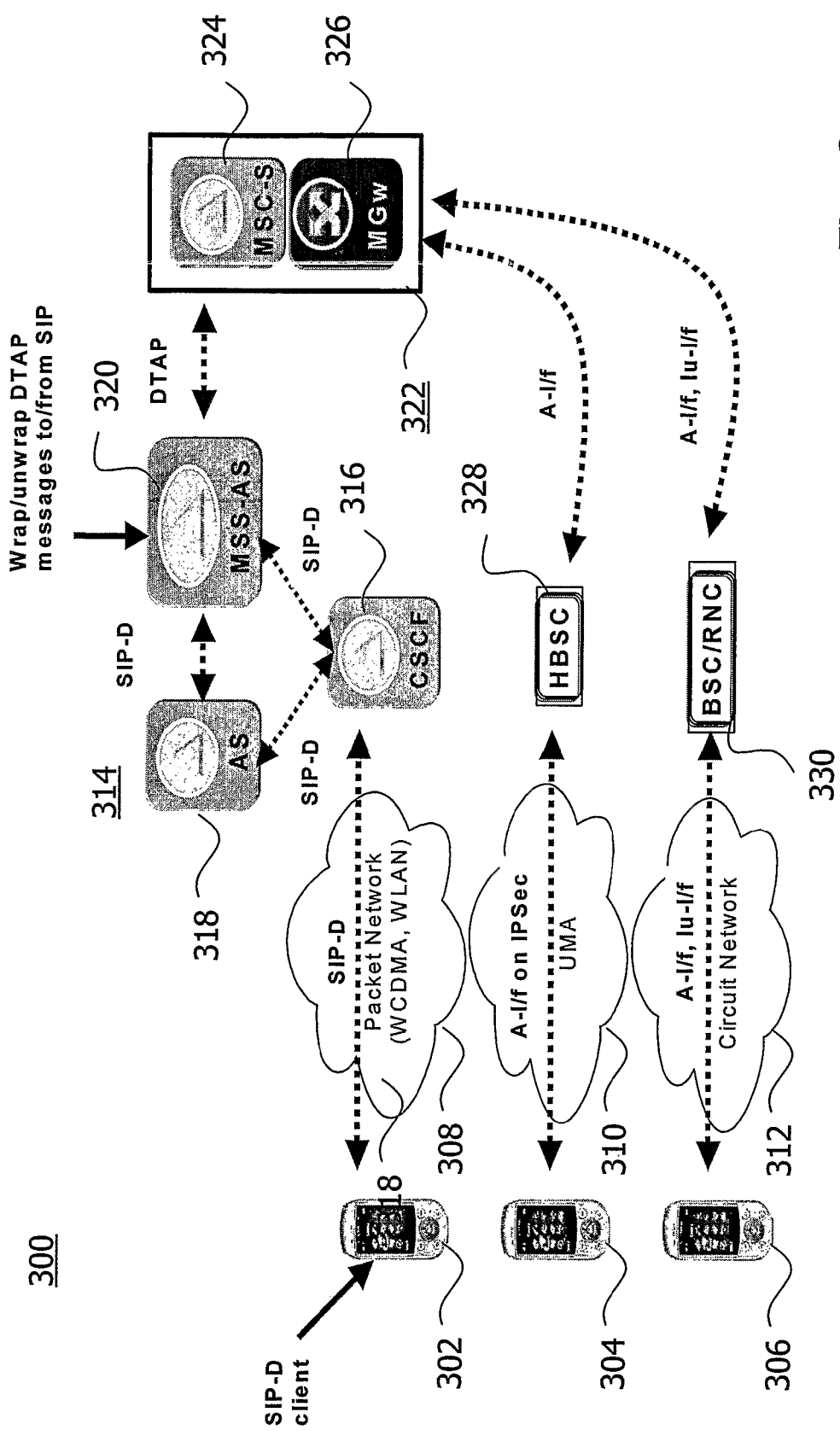
FIG. 3 is a schematic diagram showing a system embodiment of the present invention.

FIG. 3 shows an embodiment of a communication system 300 for providing end-to-end connections between various user terminals 302, 304 and 306. A first user terminal 302 is configured as SIP client and has access to a PS network 308. The PS network 308 may be a wired network, a wireless network or a combination of these two network types. The PS network 308 may be configured as a WCDMA network or a WLAN. According to a further variation, the PS network may be a network operated under GSM within the regime of the general packet radio service (GPRS).

A second user terminal 304 is provided with access to an unlicensed mobile access (UMA) network 310. The UMA technology provides access to GSM and GPRS mobile services over unlicensed spectrum technologies, including Bluetooth and IEEE 802.11 standards. A third user terminal 308 is provided with access to a CS network such as a PLMN.

The first user terminal 302 communicates via the PS network 308 with an IMS sub-system 314. The IMS sub-system 314 includes a (S-) CSCF on a control layer as well as a first application server 318 on the application layer. In the present embodiment, the first application server 318 is configured as a SIP-AS or any other IMS-AS. An additional second application server 320 that may or may not belong to the IMS sub-system 314 is configured as a dedicated MSS-AS.

SIP-D control messages are exchanged via the PS network 308 between the first user terminal 302 and the IMS sub-system 314. In the context of the present embodiment, SIP-D information denotes messages, parameters, etc. according to the SIP standard that include encapsulated DTAP information (DTAP messages, DTAP parameters, etc.). Within the IMS sub-system 314, the SIP-D messages that are sent from the first user terminal 302 are received by the CSCF 316 and routed to one or both of the application servers 318, 320. The application servers 318 and 320 communicate via SIP-D messages with each other.

The system 300 further comprises a MSS sub-system 322 that implements a layered network architecture. The MSS sub-system 326 includes a MSC-S 324 as well as a MGW 326. The MSC-S terminates and originates and re-routes control layer protocols and, importantly, additionally application layer protocols. In non-layered networks, it would also be possible to use a traditional (non-layered) MSC or even a telephony server or switch as available in wired networks.

The MSS sub-system 322 is coupled via the IMS sub-system 314 and the PS network 308 to the first user terminal 302. The MSS sub-system 322 is additionally coupled to the second user terminal 304 via a home base station controller (HBSC) 328 and the UMA network 310. Furthermore, the MSS sub-system 322 is coupled via a base station controller (BSC) or a radio network controller (RNC) and the CS network 312 to the third user terminal 306.

In the system 300 shown in FIG. 3, the MSS-AS 320 is the crucial component for providing the interworking between the IMS/PS domain and the control layer (CSCF is 316) on the one hand and the MSS sub-system 322 and the application layer (MSC-S 324), where conventional CS services reside, on the other hand. Accordingly, the MSS-AS 320 ensures that CS telephony and other CS services that are needed in the PS/IMS domain can easily be provided by operators with an installed MSS sub-system 322 or with the intention to deploy such a MSS sub-system 322. At least during the transition phase from CS to IMS/PS, the MSS-AS 320 is the entity that provides the compatibility. The MSS-AS 320 is therefore useful to network operators that prefer to utilize available CS services also for PS/IMS subscribers.

In the following two different scenarios of providing telephony or other services to the first user terminal 302 will be discussed with reference to the schematic diagrams shown in FIGS. 4 and 5 that are derived from FIG. 3. In these scenarios, the DTAP or other service parameters required for providing the CS services in the MSS sub-system 322 are generated and encapsulated in a SIP-D message by a client component within the first user terminal 302. The SIP-D message thus generated is transferred from the first user terminal 302 via the CSCF 316 (and optionally via the SIP-AS 318) to the MSS-AS 320. The MSS-AS 320 extracts the service parameters and generates a plain DTAP message including the extracted service parameters. The MSS-AS 320 may alternatively perform a mapping of SIP messages and parameters to DTAP messages and parameters.

The DTAP messages and parameters may include service-related information such as information about how to execute a particular service. Examples of services are supplementary services (e.g. call forwarding or barring services), CAMEL/IN services, routing to voice mail systems, etc. Additionally, the activation and deactivation and also the change of settings of services (called supplementary service invocations) via dedicated messages is possible (e.g. activation/deactivation of a call forwarding or the change of the call forwarded number). When BSSMAP messages are generated in the MSS-AS 320, also mobility services like roaming, handover, traffic channel assignment priority handling (e.g. eMLPP, as specified in 3GPP), etc. become feasible. This applies to GSM (A interface) and WCDMA (Iu interface) accesses, but also to any other access type.

The DTAP messages generated by the MSS-320 are sent to the MSS sub-system 322 and more specifically to the MSC-S 324 of the MSS sub-system 322. When a call or session is routed to the MSS sub-system 322, there are basically two options how to proceed further. According to a first option, the MSS sub-system 322 executes the requested service (e.g. CAMEL/IN), possibly modifies some of the parameters (e.g. a destination number) and returns the call or session to the IMS sub-system 314 (CSCF 316). According to a second option the MSS sub-system 322 executes the requested service and remains in the CS domain (i.e. the call or session is not returned to the IMS subsystem 314 anymore). It should be noted that the latter option is not in accordance with the pertinent standards (3GPP) as the application server is supposed to return the call or session to the control node (e.g. to the CSCF 316) but can nevertheless be implemented where appropriate.

Figure 4:
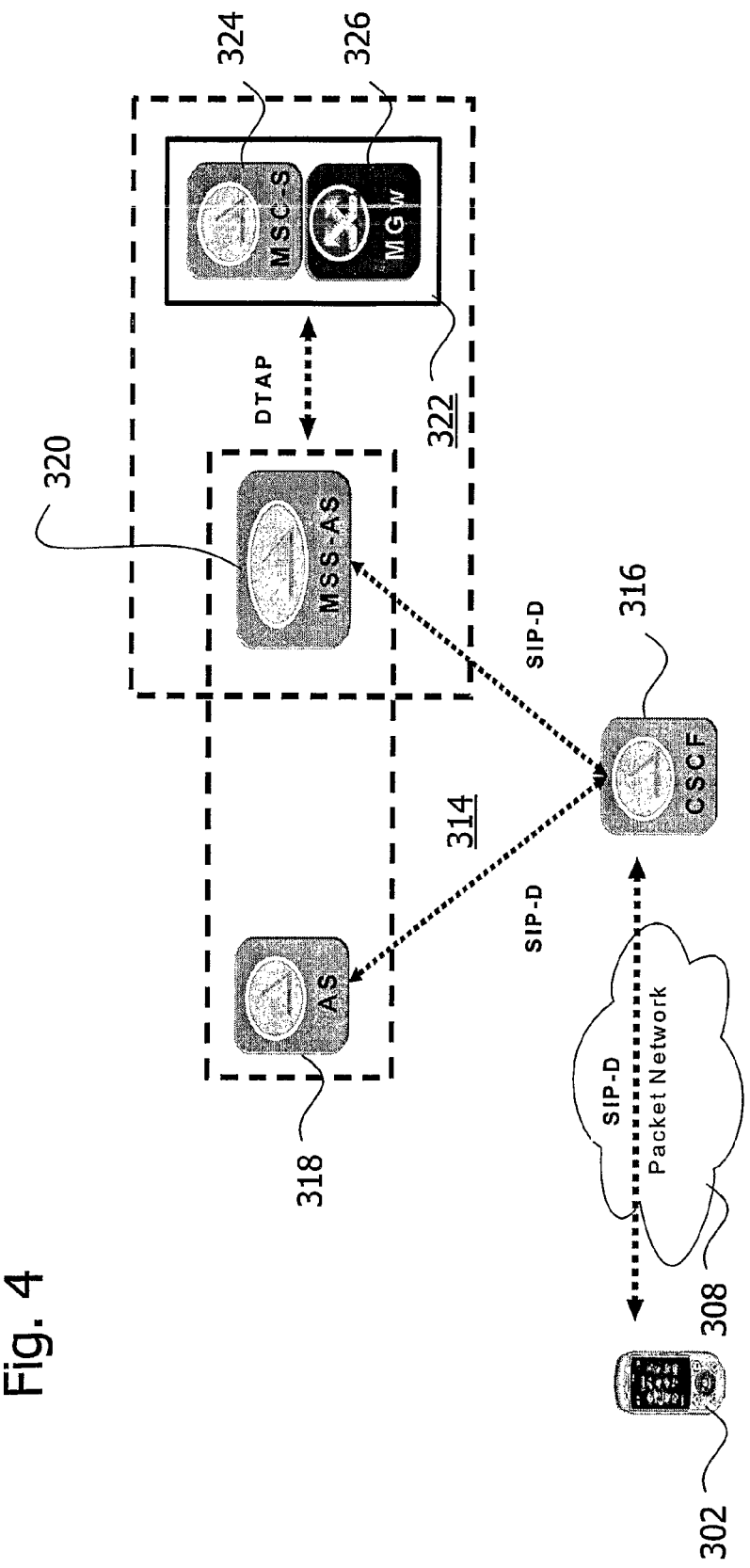
FIG. 4 is a schematic diagram showing a first configuration of a part of the system embodiment of FIG. 3.

Returning now to the service selection within the IMS domain, in the scenario shown in FIG. 4 the CSCF 316 selects the application services to which the SIP-D message that includes the service parameters will be routed. The CSCF 316 selects either the SIP-AS 318 or the MSS-AS 320 depending upon the service specified in the service parameters. Towards the SIP-AS 318, the CSCF 316 uses either plain SIP or SIP-D, whereas the interface to the MSS-AS 320 is SIP-D. In case both the SIP-AS 318 and the MSS-AS 320 support the corresponding service, the selection performed by the CSCF 316 can be based on other criteria such as load balancing, terminal capabilities, user service profile (subscriber profile), subscriber request, etc.

The MSS-AS 320 shown in FIG. 4 can be a stand-alone component or co-located with the SIP-AS 318 or any other IMS-AS. Alternatively, the MSS-AS 320 could be co-located with the CSCF 316 or with the MSC-S 324 (as part of the MSS sub-system 322). Some of the possible locations of the MSS-AS 320 are indicated in FIG. 4 by dashed lines.

In a further scenario similar to FIG. 4, the CSCF 316 selects both the SIP-AS 318 and the MSS-AS 320. Such an approach may be advantageous if some services are to be provided in the PS domain (via the SIP-AS 318) while other services are at the same time to be provided in the CS domain (via the MSS-AS 320 and the MSC-S 324).

Figure 5:
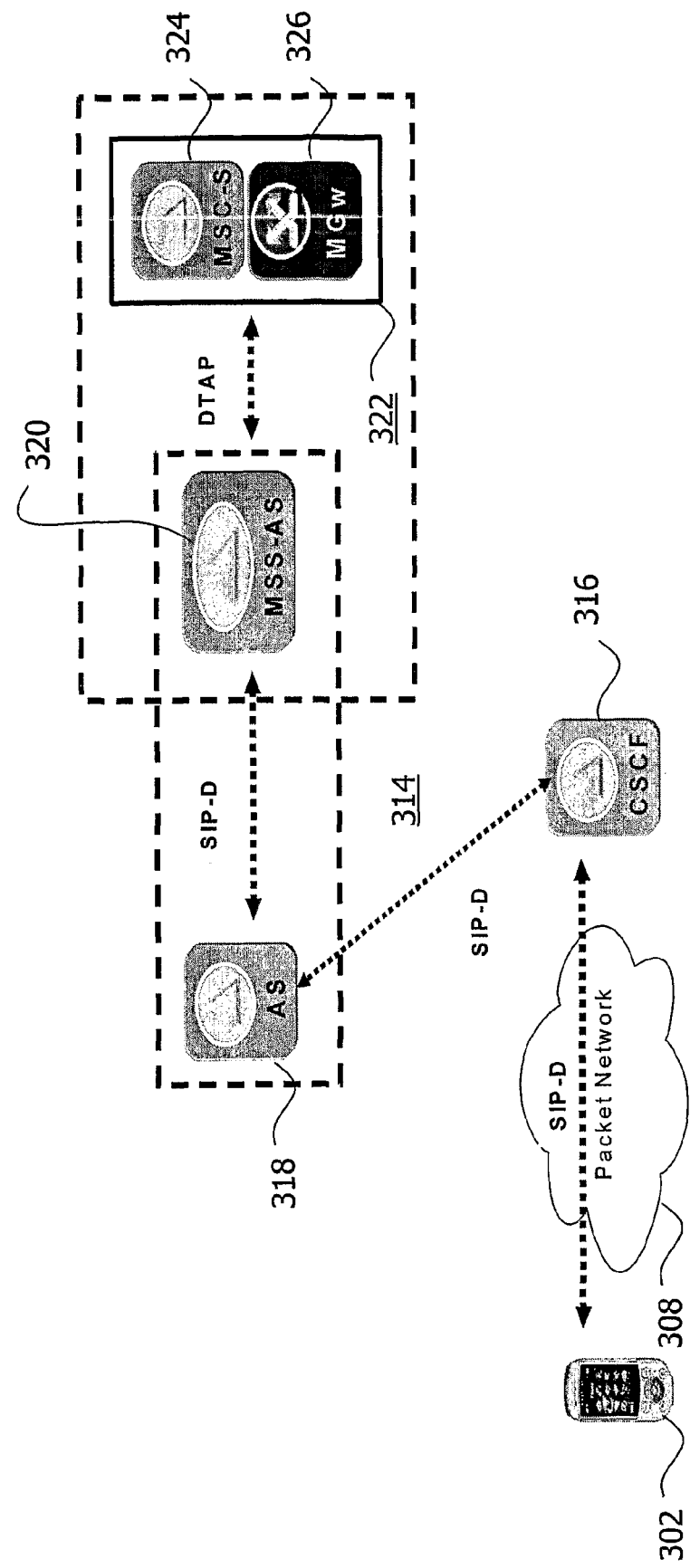
FIG. 5 is a schematic diagram showing a second configuration of a part of the system embodiment of FIG. 3.

In the scenario of FIG. 5, an alternative messaging picture is shown. Here, the CSCF 316 routes any SIP-D messages that include a service request from the user terminal 302 by default to the SIP-AS 318. Accordingly, the CSCF 316 does not need any knowledge about the existence of the MSS-AS 320. In cases in which the SIP-AS 318 does not yet support the requested service, or in other cases, it re-routes the SIP-D message received from the CSCF 316 to the MSS-AS 320. Accordingly, the selection of the MSS-AS 320 is here performed by the SIP-AS 318 depending upon its own capabilities. This approach is preferred from a migration point of view. Also, the approach allows hiding of the service capabilities on the application layer from the CSCF 316, i.e. from the IMS core. Just as in FIG. 4, the MSS-AS 320 may again be a stand-alone component or co-located with for example the SIP-AS 318 or the MSC-S 324 as part of the MSS (see dashed lines).

In the scenarios discussed above, the relevant DTAP service parameters may alternatively by specified in SIP-UNI messages. The SIP-UNI messages including these parameters may then be transferred from the first user terminal 302 to the application layer as discussed above. It should be noted that more and more service parameters are expected to be specified in the SIP-UNI standard. In some cases, BSSMAP messaging may be used in the CS domain in addition to DTAP messages. DTAP and BSSMAP messages may be transported via the signalling layer 7 (SS7) or the Sigran standard. Also, SCTP/IP or TCP/IP could be used.

When the PS user terminal 302 initially registers in the CSCF 316, it also may be registered in the CS domain. This may be done directly via the MSS-AS 320 (DTAP/BSSMAP messaging) in the MSC-S 324 and the HLR or HSS (not shown in FIG. 3). It may also be done in such a way that the MSS-AS 320 stores the registration information and registers in MSC-S 324 and HLR/HSS when the MSS-AS 320 is invoked (as that may actually never happen while the subscriber is roaming in the corresponding PS access network). Once the subscriber is registered in the HLR/HSS, the HLR/HSS can be invoked by the MSC-S 324 for the subscriber profile (supported services etc.). It should be noted that the operator still has to enter the subscriber in the HLR/HSS as is done for normal CS subscribers.

While a particular conversion scenario is shown in FIG. 3 (de-encapsulation of DTAP from SIP-D), the MSS-AS may additionally or alternatively be configured to convert relevant information from SIP to DTAP (e.g. map SIP messages and parameters to DTAP messages and parameters), convert relevant information from SIP to BSSMAP (e.g. map SIP messages and parameters to BSSMAP messages and parameters), generate DTAP messages based on other criteria (e.g. operator settings, user settings or default parameters), generate BSSMAP messages based on other criteria (e.g. operator settings, user settings or default parameters), and vice versa. It will be appreciated that SIP messages may also be converted into DTAP parameters and SIP parameters may be converted into DTAP messages (and vice versa). It should additionally be noted that there may be an n:m relation between the messages and parameters on the PS and CS sides.

This also implies that the MSS-AS may need to wait for a second message from the PS domain before a corresponding message is sent to the MSC-S (and vice versa).

The protocol conversion steps discussed above ensure a high compatibility between PS architectures such as IMS on the one hand and CS architectures such as MSS on the other hand. This compatibility facilitates migration towards an all-IP solution and permits a continued use of CS network infrastructure such as MSC-S. In particular, the interconnecting approach allows for a provision of CS services to network component having a PS network access (e.g., via a WCDMA network, via a GPRS network or via WLAN). In this connection, the switching component (MSC-S) moves at least in part from the control layer to the application layer and becomes an application server, and the MSS-AS intermediates between the IMS control layer and the MSS application layer. It should be noted here that the invention can not only be practiced in layered networks of the MSS type, but also in conventional networks. In such a case, the tasks in relation to CS services discussed above may be provided by an appropriately configured MSC.

The solutions illustrated in the above embodiments offer a standard way of providing CS telephony and other services to IMS clients. They also permit a smooth migration from CS to IMS and a reuse of installed equipment for operators.

While the current invention has been described in relation to its preferred embodiments, it is to be understood that this disclosure is only illustrative. Accordingly, it is intended that the invention be limited only by the scope of the claims appended hereto.

The invention claimed is:

1. A method of controlling the provision of circuit-switched (CS) services to a user terminal having a packet-switched (PS) network access, the method comprising:
   receiving PS control information according to a PS control protocol from the user terminal, the PS control information including encapsulated CS control information according to a CS control protocol;
   extracting, in response to receipt of the PS control information, the CS control information from the PS control information; and
   sending, according to the CS control protocol, the extracted CS control Information to a network component located on an application layer for controlling, based on the determined CS control information, provision of CS services to the user terminal, wherein a device performs the receiving step, the extracting step and the sending step.

2. The method of claim 1, wherein the PS control information includes at least one of:
   one or more PS control messages and one or more PS control parameters; and the CS control information includes at least one of one or more CS control messages and one or more CS control parameters.

3. The method of claim 1, wherein the CS control information is encapsulated in the PS control information by a client component within the user terminal, and wherein the step of extracting the CS control information from the PS control Information includes de-encapsulating the CS control information from the PS control information.

4. The method of claim 1, wherein the CS control Information is specified in the form of CS control parameters in the PS control information, and wherein the step of extracting the CS control Information from the PS control information includes extracting the CS control parameters from the PS control information and generating a CS control message including the extracted CS control parameters.

5. The method of claim 1, wherein the CS control information includes one or more of: information pertaining to a requested service type, information required to establish CS services, information about how to execute CS services, and information about the status or result of CS services.

6. The method of claim 1, wherein the step of determining the CS control information is performed by services intermediating between a PS control layer and a CS application layer.

7. The method of claim 1, wherein the network component is one of a MSC server (MSC-S) and a mobile softswitch (MSS).

8. The method of claim 1, further comprising providing first services Interpreting the PS control information by default and second services capable of extracting the CS control information from the PS control information 9. The method of claim 8, further comprising routing the received PS control information to the first services, and re-routing the PS control information from the first services to the second services.

10. The method of claim 9, further comprising the step of deciding, by the first services, whether or not to re-route the PS control information.

11. The method of claim 10, wherein the decision is based on at least one of a service portfolio of the first services and a request included in the received PS control Information.

12. The method of claim 8, further comprising selectively routing the PS control information to either one of the first services and the second services.

13. The method of claim 12, wherein the routing to either one of the first services and the second services is dependent upon one or more of the following criteria: the CS services requested, load-balancing considerations, capabilities of the user terminal, trigger events defined by a network operator, user requests, and user service profiles.

14. The method of claim 1, further comprising the steps of receiving CS control information; and determining, in response to receipt of the CS control Information, PS control Information according to the PS control protocol.

15. The method of claim 14 further comprising sending the determined PS control information to the user terminal.

16. The method of claim 1, further comprising the step of registering the user terminal having the PS network access in a CS domain.

17. The method of claim 1, wherein the device is a mobile soft switching-application server (MSS-AS).

18. A device for interconnecting packet-switched (PS) and circuit-switched (CS) domains, the device comprising:
   a control component for receiving PS control information according to a PS control protocol from a user terminal, the PS control information including CS control information, according to a CS control protocol, encapsulated in the PS control information by a client component within the user terminal;
   a protocol converter for extracting, in response to receipt of the PS control information, the CS control information from the PS control information; and
   an interface for sending, according to the CS control protocol, the extracted CS control information to a serving network component that is located on an application layer and provides the CS services based on the determined CS control Information.

19. The device of claim 18, wherein the protocol converter includes program code for at least one of mapping the received PS control information to predefined CS control information; and de-encapsulating the CS control information from the PS control information.

20. The device of claim 18, wherein the protocol convertor is co-located with one of the control component, the serving network component and a service component that handles the PS control information by default.

21. The device of claim 18, wherein:
the device is a mobile soft switching-application server (MSS-AS)
the control component receives the PS control information from an application server or a call session control function (CSCF); and
the serving network component is a mobile switching center server (MSC-S).

22. The device of claim 18, wherein the CS control information is a base station system management application part (BSSMAP) message or a direct transfer application part (DTAP) message.

23. A method of controlling the provision of circuit-switched (CS) services to a user terminal having a packet-switched (PS) network access, the method comprising:
receiving PS control information according to a PS control protocol from the user terminal, the PS control information including encapsulated CS control messages, wherein the CS control messages are base station system management application part (BSSMAP) messages or direct transfer application part (DTAP) messages;
extracting, in response to receipt of the PS control information, CS control information from the PS control information; and
sending, according to the CS control protocol, the extracted CS control Information to a network component located on an application layer for controlling, based on the determined CS control information, provision of CS services to the user terminal, wherein a device performs the receiving step the extracting step and the sending step.

24. A system for providing telecommunication services to a user terminal, the system comprising:
a call session control function (CSCF) for receiving a session initiation protocol (SIP) message containing packet-switched (PS) control information according to a PS control protocol from the user terminal, the PS control information including circuit-switched (CS) control information, according to a CS control protocol, encapsulated in the PS control information by a client component within the user terminal;
an application server (AS);
a mobile soft switching-application server (MSS-AS);
the CSCF forwards the SIP message to at least one of the AS and the MSS-AS, wherein the CSCF forwards the SIP message to the MSS-AS, the MSS-AS comprises:
a control component for receiving the SIP message;
a protocol converter for extracting, in response to receipt of the SIP message, the CS control information from the PS control information; and
an interface for sending, according to the CS control protocol, the extracted CS control information to a serving network component that is located on an application layer and provides CS services based on the determined CS control Information to the user terminal.

25. The system of claim 24, wherein when the CSCF forwards the SIP message to both the AS and the MSS-AS then the AS provides a PS service in a PS domain to the user terminal while the MSS-AS and the serving network terminal provides the CS service in a CS domain to the user terminal.

26. A system for providing telecommunication services to a user terminal, the system comprising:
a call session control function (CSCF) for receiving a session initiation protocol (SIP) message containing a packet-switched (PS) control information according to a PS control protocol from the user terminal, the PS control information including circuit- switched (CS) control information, according to a CS control protocol, encapsulated in the PS control information by a client component within the user terminal;
an application server (AS);
a mobile soft switching-application server (MSS-AS);
the CSCF forwards the SIP message to the AS and then the AS forwards the SIP message to the MSS-AS, the MSS-AS comprises:
a control component for receiving the SIP message;
a protocol converter for extracting, in response to receipt of the SIP message, the CS control information from the PS control information; and
an interface for sending, according to the CS control protocol, the extracted CS control information to a serving network component that is located on an application layer and provides CS services based on the determined CS control Information to the user terminal.

* * * * *